United States Patent [19]

Shuler

[11] 4,125,032

[45] Nov. 14, 1978

[54] ACTUATING MECHANISM FOR HYDROSTATIC TRANSMISSION

[75] Inventor: Lucien B. Shuler, Peoria, Ill.

[73] Assignee: Caterpillar Tractor Co., Peoria, Ill.

[21] Appl. No.: 809,724

[22] Filed: Jun. 24, 1977

[51] Int. Cl.² .............. F16H 21/44; G05G 1/14; G05G 7/04

[52] U.S. Cl. .............................. 74/96; 74/470; 74/474; 74/516

[58] Field of Search ............. 74/96, 97, 470, 474, 74/516, 518

[56] References Cited

U.S. PATENT DOCUMENTS

| | | | |
|---|---|---|---|
| 2,231,609 | 2/1941 | Andersen | 74/10.9 X |
| 2,784,602 | 3/1957 | Sprow | 74/97 |
| 3,055,226 | 9/1962 | Kiessling | 74/470 |
| 3,196,699 | 7/1965 | Ipsen | 74/96 |
| 3,276,285 | 10/1966 | Irgens | 74/470 |
| 3,491,605 | 1/1970 | MacDonald | 74/96 |
| 3,727,481 | 4/1973 | Nicholson | 74/96 X |
| 3,952,512 | 4/1976 | Feller | 74/474 X |
| 4,052,910 | 10/1977 | Olt, Jr. et al. | 74/470 X |

FOREIGN PATENT DOCUMENTS 598,605  10/1959  Italy ................................ 74/96

Primary Examiner—Allan D. Herrmann
Attorney, Agent, or Firm—Phillips, Moore, Weissenberger, Lempio & Majestic

[57] ABSTRACT

An actuating mechanism for selectively actuating the control valve of a transmission or the like comprises a rotary input shaft connected to a pair of links at a lost-motion connection. Opposite ends of the links are pivotally connected to a crank assembly pivotally mounted on a rotary input shaft connected to the control valve. A torsion spring is interconnected between the rotary output shaft, the crank assembly and one of the links to selectively rotate the rotary output shaft in opposite directions in response to rotation of the rotary input shaft in opposite directions.

7 Claims, 3 Drawing Figures

ACTUATING MECHANISM FOR HYDROSTATIC TRANSMISSION

BACKGROUND OF THE INVENTION

Hydrostatic transmissions and the like are normally selectively placed in a forward or reverse mode of operation upon actuation of a rotary control shaft. A conventional actuating mechanism therefor is oftentimes unduly complex and requires close manufacturing tolerances to precisely control actuation of the transmission. In addition, many such mechanisms include linkage systems which exhibit excessive input torque characteristics.

One approach to alleviating the latter problem is to reduce the preload on an override spring link and by further reducing related friction in the linkage system. However, such preload cannot be reduced without also reducing the preload on the centering spring employed in the servovalve controlling operation of the transmission which is relatively low in magnitude to start with. Attempts to increase the mechanical advantage of the treadle of such linkage system have proved impractical since treadle motion would necessarily require a substantial increase. Also, the design of present day engine governor systems render it impractical to reduce input forces applied thereto.

SUMMARY OF THIS INVENTION

The present invention is directed to overcoming one or more of the problems as set forth above.

The actuating mechanism of this invention comprises rotary input means, rotary output means and drive input means connected to the rotary input means. A spring means is interconnected between the drive input means and the rotary output means for selectively rotating the rotary output means in opposite directions in response to rotation of the rotary input means in opposite directions. This relatively non-complex arrangement is economical to manufacture and exhibits a high degree of structural integrity and precise control of a hydrostatic transmission. In addition, the input torque characteristics thereof are substantially less than conventional linkage systems employed for actuating the control valve of a hydrostatic transmission.

BRIEF DESCRIPTION OF THE DRAWINGS

Other objects of this invention will become apparent from the following description and accompanying drawings wherein.

DETAILED DESCRIPTION

Figure 1:
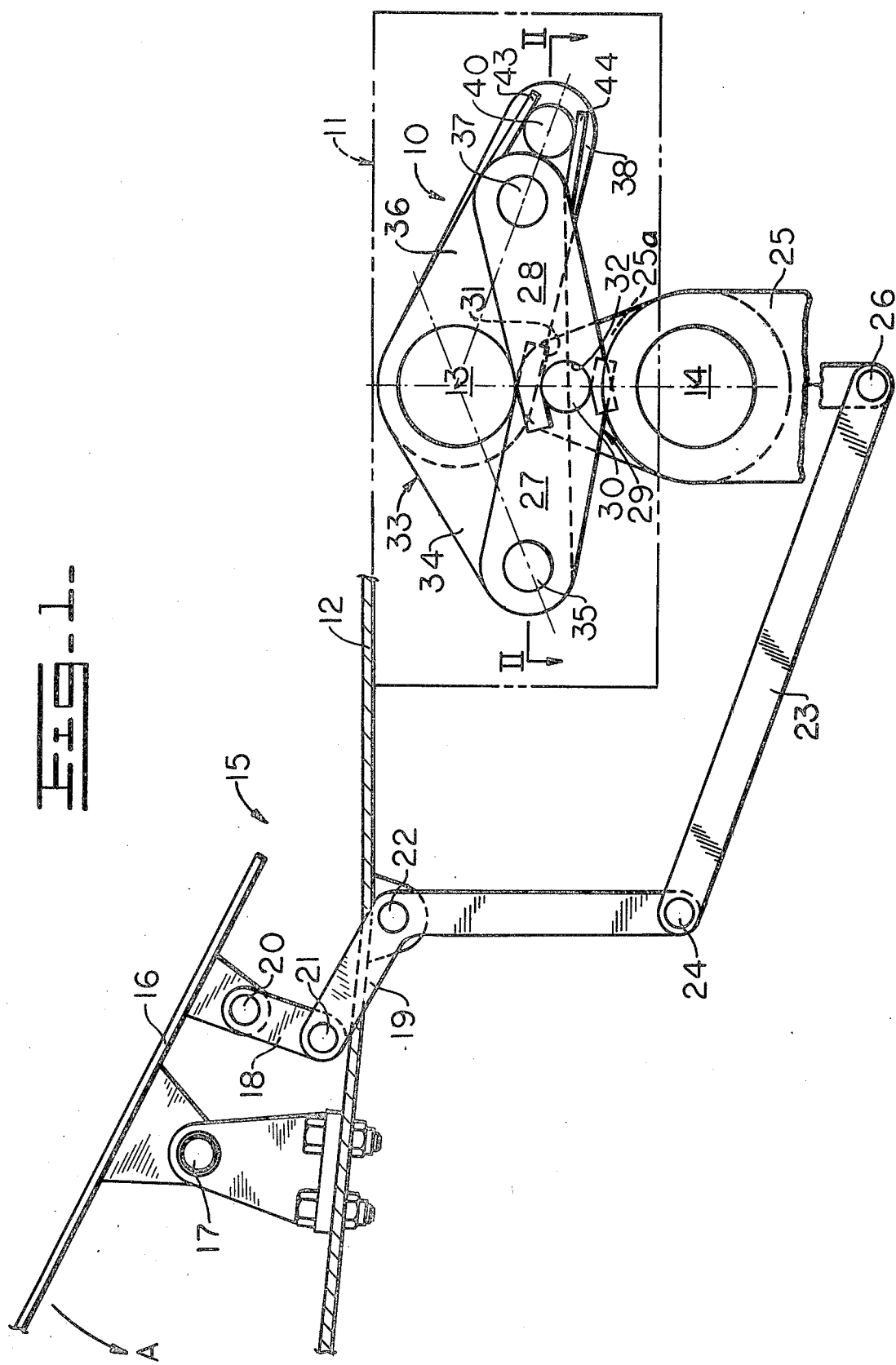
FIG. 1 is a side elevational view of an actuating mechanism and attendant control linkage, shown in their neutral conditions of operation, for selectively actuating a rotary output shaft adapted to be operatively connected to a control valve of a hydrostatic transmission.
Figure 2:
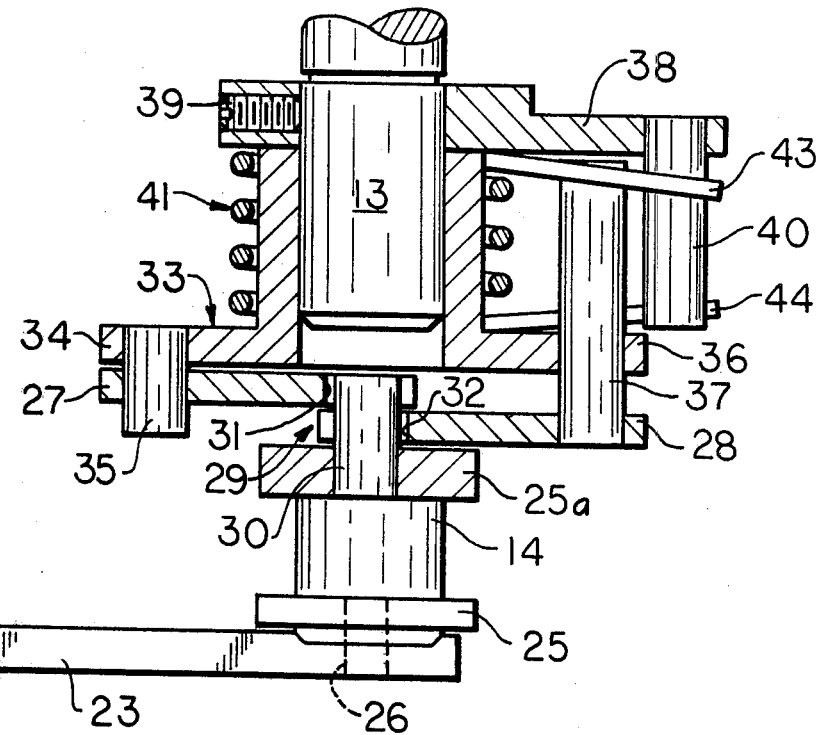
FIG. 2 is a partially sectioned view through the actuating mechanism, taken in the direction of arrows II—II in FIG. 1.

FIGS. 1 and 2 illustrate an actuating mechanism 10 suitably mounted in a schematically illustrated housing 11, secured beneath a stationary support or plate 12. The housing may be of conventional design to fully enclose and seal the mechanism for protection and lubrication purposes. A rotary output means or shaft 13 of the actuating mechanism is rotatably mounted on the housing and is adapted for connection to a control valve (not shown) of a hydrostatic transmission in a conventional manner.

Rocking movements are selectively imparted to output shaft 13 by a rotary input means or shaft 14 which is suitably connected to a pedal-actuated control linkage 15 for this purpose. Linkage 15 comprises a foot pedal or treadle 16 pivotally mounted on support plate 12 by a pin 17 for rocking movements in opposite directions. A link 18 is pivotally interconnected between the pedal and a bellcrank 19 by pins 20 and 21, respectively.

The bellcrank is pivotally mounted on support plate 12 by a pin 22 and is further pivotally connected to a link 23 by a pin 24. The link is further pivotally connected to a first actuating arm 25 by a pin 26. The actuating arm is suitably secured to input shaft 14 along with a second actuating arm 25a to thus rock it in opposite directions in response to depression of pedal 16 in opposite directions.

Actuating mechanism 10 further comprises drive means including a pair of links 27 and 28 connected to second actuating arm 25a by a lost motion connection 29. The lost motion connection comprises a pin 30 secured to arm 25a and a pair of open-ended slots 31 and 32 formed on first ends of links 27 and 28, respectively, to straddle the pin.

A crank assembly 33 is rotatably mounted on output shaft 13 and has a first arm 34 pivotally connected to a second end of link 27 by a pin 35. A second arm 36 of the crank is pivotally connected to a second end of link 28 by an idler pin 37. A second crank 38 is secured on output shaft 13 by a set screw 39 and has an input pin 40 secured thereon to extend in parallel relationship and closely adjacent to idler pin 37.

A spring means, preferably a torsion coil spring 41, is mounted on a hub 42 of crank 33. Opposite ends 43 and 44 of the spring straddle opposite sides of pins 37 and 40. As described hereinafter, rotation of input shaft 14 in opposite directions will function to rotate output shaft 13 in opposite directions, via spring 41.

Depression and pivoting of pedal 16 in a counterclockwise direction A about the axis of pin 17 in FIG. 1 will, in turn, rock input shaft 14 clockwise and in a pivoted direction A'. Arm 25a will follow in a like direction to pivot link 28 to its FIG. 3 position whereby idler pin 37 will tend to urge overlying end 43 of spring 41 upwardly. The spring, in turn, will torsion whereby end 44 thereof will engage the underside of input pin 40 to rotate crank 38 and thus output shaft 13 in a counterclockwise direction A". It should be noted that the disposition of link 27 remains undisturbed due to the lost-motion provided at slot 31.

Figure 3:
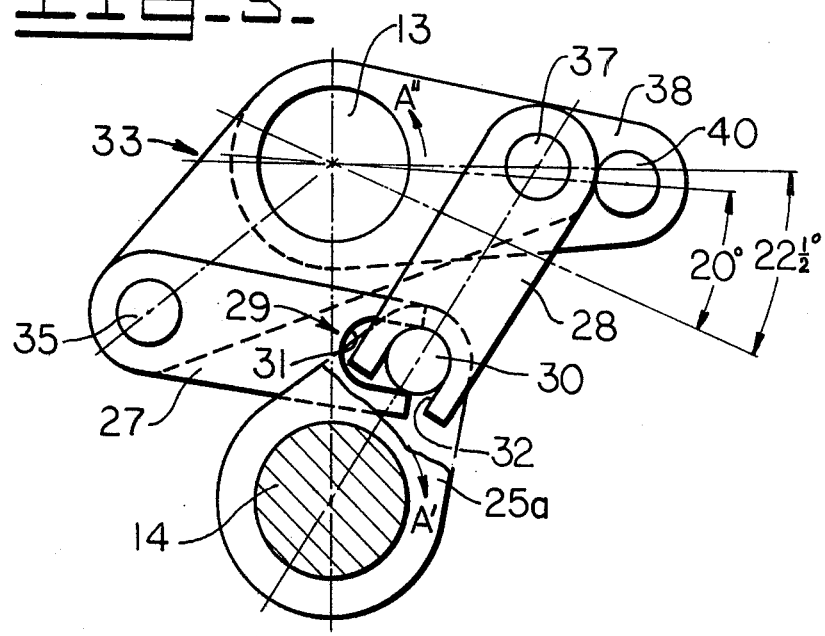
FIG. 3 is a view somewhat similar to FIG. 1, but illustrating the actuating mechanism in a full speed forward condition of operation.

FIG. 1 illustrates actuating mechanism 10 in its neutral or centered condition of operation whereas the FIG. 3 condition may be considered to place the transmission in its full speed forward mode of operation, as depicted by 20° counterclockwise movement of input pin 40 about the rotational axis of output shaft 13. It can be assumed that the foot pedal has simultaneously actuated an engine throttle control lever to maintain approximately 50% of engine speed, for example. Further movement of foot pedal 16 to its maximum position will function to pivot input pin 37 only an additional 2¼° about the rotational axis of output shaft 13. In this condition of the actuating mechanism, pin 30 will be moved into an over-center position relative to idler pin 37.

When pedal 16 is depressed to pivot it in a clockwise direction about the axis of pin 17 in FIG. 1, the above procedure will be substantially reversed. In particular, input shaft 14 and arm 25a will rotate in a counterclockwise direction to pivot link 27 outwardly and upwardly. In response thereto, crank 33 will rotate in a clockwise direction on output shaft 13 to rotate idler pin 37 into engagement with the upper side of spring end 44. The spring will torsion to engage end 43 thereof with the upper side of input pin 40 to pivot crank 38 and output shaft 13 in a clockwise direction in FIGS. 1 and 3.

The embodiments of the invention in which an exclusive property or privilege is claimed are defined as follows:

1. An actuating mechanism comprising
   rotary input means for rotating in opposite directions,
   rotary output means for rotating in opposite directions,
   drive means connected to said rotary input means and said rotary output means for selectively rotating said rotary output means in response to rotation of said rotary input means, and
   biasing means interconnected between said input means and said rotary output means for selectively rotating said rotary output means in opposite directions in response to rotation of said rotary input means in opposite directions,
   said input means comprising a pair of links and lost-motion connection means for permitting movement of only one of said links upon rotation of said input means in one direction.

2. The actuating mechanism of claim 1 wherein said rotary input means comprises an input shaft and an actuating arm secured to said input shaft and wherein said pair of links are connected to said actuating arm by said lost-motion connection means.

3. The actuating mechanism of claim 2 wherein said lost-motion connection means comprises a pin secured to said actuating arm and a slot formed in a first end of each of said links and disposed in straddling relationship on said pin.

4. The actuating mechanism of claim 3 wherein said input means further comprises a first crank rotatably mounted on said rotary output means and wherein said first crank is pivotally connected to a second end of each of said links.

5. The actuating mechanism of claim 4 wherein said rotary output means comprises a second crank secured to an output shaft.

6. The actuating mechanism of claim 5 wherein a second end of one of said links is pivotally connected to said first crank by an idler pin and wherein an input pin is secured to said second crank and wherein said biasing means is interconnected between said idler and input pins.

7. The actuating mechanism of claim 6 wherein said biasing means comprises a torsion spring having opposite ends thereof disposed in straddling relationship relative to said idler and input pins.